United States Patent
Liang et al.

(10) Patent No.: US 10,852,176 B2
(45) Date of Patent: Dec. 1, 2020

(54) WATER FULLNESS ALARM DEVICE AND A DEHUMIDIFIER

(71) Applicants: HISENSE HOME APPLIANCES GROUP CO., LTD., Guangdong (CN); Hisense (Guangdong) Air Conditioner Co., Ltd., Guangdong (CN)

(72) Inventors: Bingxiang Liang, Guangdong (CN); Yufeng Tan, Guangdong (CN); Jianguo Zhu, Guangdong (CN); Minzhu Huang, Guangdong (CN); Wei Tang, Guangdong (CN)

(73) Assignees: HISENSE HOME APPLIANCES GROUP CO., LTD., Guangdong (CN); Hisense (Guangdong) Air Conditioner Co., Ltd., Guangdong (CN)

( * ) Notice: Subject to any disclaimer, the term of this patent is extended or adjusted under 35 U.S.C. 154(b) by 178 days.

(21) Appl. No.: 16/144,647

(22) Filed: Sep. 27, 2018

(65) Prior Publication Data
US 2019/0101432 A1     Apr. 4, 2019

Related U.S. Application Data

(63) Continuation of application No. PCT/CN2016/083736, filed on May 27, 2016.

(30) Foreign Application Priority Data

Mar. 28, 2016  (CN) .......................... 2016 1 0181914

(51) Int. Cl.
*G01F 23/34*    (2006.01)
*F24F 3/14*    (2006.01)
(Continued)

(52) U.S. Cl.
CPC ................ *G01F 23/34* (2013.01); *F24F 3/14* (2013.01); *F24F 11/30* (2018.01); *H01H 35/18* (2013.01);
(Continued)

(58) Field of Classification Search
CPC .......... G01F 23/30; G01F 23/32; G01F 23/34; H01H 35/18; F24F 3/14; F24F 11/30; F24F 11/89; F24F 2003/144
See application file for complete search history.

(56) References Cited

U.S. PATENT DOCUMENTS 1,620,823 A * 3/1927 Mabie ..................... G01F 23/34
                                                        73/306
1,725,208 A * 8/1929 Potter .................... H01H 35/18
                                                        200/84 R
(Continued)

FOREIGN PATENT DOCUMENTS

CN       2204406 Y    8/1995
CN     201348974 Y   11/2009
(Continued)

OTHER PUBLICATIONS

Machine translation of CN 201373512 (Year: 2009).*
(Continued)

*Primary Examiner* — David J Bolduc
(74) *Attorney, Agent, or Firm* — Brinks Gilson & Lione

(57) ABSTRACT

A water fullness alarm device may include an alarm switch, a bracket, and a float. The alarm switch may include an alarm switch body and a switch button disposed on the alarm switch body, where the switch button is adjacent to an elastic piece, and where a first end of the elastic piece is fixed on the alarm switch body and a second end of the elastic piece is free. The bracket may be rotatable, where a first end of the bracket is connected with the float, and where a second end (Continued)

of the bracket is propped against the elastic piece. The first end and the second end may be integrally formed such that the second end swings synchronously with the first end around an axis when the bracket rotates, where the second end drives the elastic piece to trigger the switch button when the bracket rotates.

18 Claims, 11 Drawing Sheets

(51) Int. Cl.
*H01H 35/18* (2006.01)
*F24F 11/30* (2018.01)
*F24F 11/89* (2018.01)

(52) U.S. Cl.
CPC ......... *F24F 11/89* (2018.01); *F24F 2003/144* (2013.01)

(56) References Cited

U.S. PATENT DOCUMENTS

| | | | | |
|---|---|---|---|---|
| 2,672,535 A * | 3/1954 | MacDonald | ........ | B60T 17/225 200/84 R |
| 2,725,196 A * | 11/1955 | Trittschuh | ........ | F24F 3/1405 236/44 A |
| 2,867,993 A * | 1/1959 | Morton | ........ | F24F 3/153 62/297 |
| 2,897,853 A * | 8/1959 | Anstine | ........ | G01F 23/34 141/95 |
| 3,110,161 A * | 11/1963 | Maleck | ........ | F24F 13/22 62/188 |
| 3,686,451 A * | 8/1972 | Pottharst, Jr. | ........ | H01H 35/18 200/84 R |
| 4,050,102 A * | 9/1977 | Kemper | ........ | E03D 5/016 4/317 |
| 4,181,021 A * | 1/1980 | Harris | ........ | G01F 23/32 73/317 |
| 4,428,207 A * | 1/1984 | Hall | ........ | F25D 21/14 62/176.1 |
| 4,475,359 A * | 10/1984 | Sano | ........ | F24F 13/222 62/150 |
| 4,587,923 A * | 5/1986 | Mejia | ........ | H01M 10/484 116/228 |
| 4,635,480 A * | 1/1987 | Hrncir | ........ | B67D 7/365 137/416 |
| 4,712,382 A * | 12/1987 | LeClear | ........ | F24F 13/22 62/150 |
| 4,742,691 A * | 5/1988 | Kennedy | ........ | F24F 1/0323 62/272 |
| 5,072,618 A * | 12/1991 | Taylor | ........ | G01F 23/32 73/317 |
| 5,156,197 A * | 10/1992 | Kiyotoki | ........ | G01F 23/30 137/435 |
| 5,294,917 A * | 3/1994 | Wilkins | ........ | G01F 25/0076 200/84 C |
| 5,365,969 A * | 11/1994 | Edwards | ........ | A47L 15/4244 134/56 D |
| 5,850,175 A * | 12/1998 | Yeilding | ........ | B60P 3/10 340/431 |
| 5,884,495 A * | 3/1999 | Powell | ........ | F24F 1/02 62/150 |
| 6,089,086 A * | 7/2000 | Swindler | ........ | G01F 23/38 73/305 |
| 6,216,534 B1 * | 4/2001 | Ross, Jr. | ........ | G01F 23/32 116/229 |
| 6,253,609 B1 * | 7/2001 | Ross, Jr. | ........ | G01F 23/32 73/290 R |
| 6,341,524 B1 * | 1/2002 | Nagase | ........ | G01F 23/34 116/229 |
| 6,375,430 B1 * | 4/2002 | Eckert | ........ | F04D 15/0218 417/36 |
| 6,992,260 B1 * | 1/2006 | Cantolino | ........ | H01H 35/18 200/84 R |
| 7,067,750 B1 * | 6/2006 | Cantolino | ........ | H01H 35/18 200/84 R |
| 7,710,283 B1 * | 5/2010 | Cantolino | ........ | B60H 1/3233 210/321.6 |
| 7,802,587 B1 * | 9/2010 | Ball | ........ | E03F 5/22 137/15.26 |
| 7,967,267 B1 * | 6/2011 | Cantolino | ........ | F24F 13/222 248/213.2 |
| 2002/0023445 A1 * | 2/2002 | Sul | ........ | F24F 13/222 62/188 |
| 2010/0000242 A1 * | 1/2010 | Chiu | ........ | F24F 13/222 62/150 |
| 2014/0083524 A1 * | 3/2014 | Huang | ........ | F16K 31/20 137/409 |
| 2015/0090349 A1 * | 4/2015 | Sada | ........ | F24F 11/30 137/386 |
| 2015/0090350 A1 * | 4/2015 | Chiu | ........ | G05D 9/12 137/409 |
| 2016/0061484 A1 * | 3/2016 | Wu | ........ | F24F 13/222 137/135 |
| 2018/0348028 A1 * | 12/2018 | Duksa | ........ | G01F 1/26 |

FOREIGN PATENT DOCUMENTS

| | | |
|---|---|---|
| CN | 201373512 Y | 12/2009 |
| CN | 201373528 Y | 12/2009 |
| KR | 10-2004-0021350 | 3/2004 |

OTHER PUBLICATIONS

International Search Report and Written Opinion of the International Search Authority dated Sep. 30, 2016 in International Application No. PCT/CN2016/083736 (English and German languages) (16 pp.).

* cited by examiner

WATER FULLNESS ALARM DEVICE AND A DEHUMIDIFIER

RELATED APPLICATIONS

This application is a continuation of International Application No. PCT/CN2016/083736, filed May 27, 2016, which claims priority to Chinese Patent Application No. 201610181914.1, filed on Mar. 28, 2016, both entitled "A WATER FULLNESS ALARM DEVICE AND A DEHUMIDIFIER." Each of these applications is hereby incorporated by reference in its entirety.

TECHNICAL FIELD

The present disclosure relates to the technical field of dehumidification equipment, in particular to a water fullness alarm device and a dehumidifier.

BACKGROUND

The device for collecting water in a dehumidifier is a water collection tank. When the water in the water collection tank reaches a certain amount, the user needs to be reminded to remove the water or the power of the dehumidifier will be directly cut off so as to prevent the water from overflowing from the water collection tank and damaging the indoor environment.

SUMMARY

In one aspect, some embodiments of the present disclosure provide a water fullness alarm device, comprising an alarm switch, a bracket and a float: the alarm switch comprises an alarm switch body, a switch button is disposed on the alarm switch body, the switch button covered with an elastic piece; one end of the elastic piece is fixed on the alarm switch body, and another end is free; the bracket is rotatable; a first end of the bracket is connected with the float, and a second end of the bracket is propped against the elastic piece, and the first end and the second end are integrally formed; the second end of the bracket propped against the elastic piece is configured to swing synchronously with the first end of the bracket around a rotating axis of the bracket when the float floats upward, and drive the elastic piece to trigger the switch button.

In a second aspect, some embodiments of the present disclosure provide a dehumidifier comprising a housing, a water collection tank and a water fullness alarm device according to the first aspect, wherein an alarm switch in the water fullness alarm device is fixed on the housing, and the float is located at the water collection tank.

BRIEF DESCRIPTION OF THE DRAWINGS

In order to describe technical solutions in embodiments of the present disclosure more clearly, the accompanying drawings to be used in describing certain embodiments are introduced briefly below. The accompanying drawings introduced below are merely some embodiments of the present disclosure, and a person of ordinary skill in the art can obtain other drawings according to the present disclosure without paying any creative effort.

DETAILED DESCRIPTION

Figure 1:
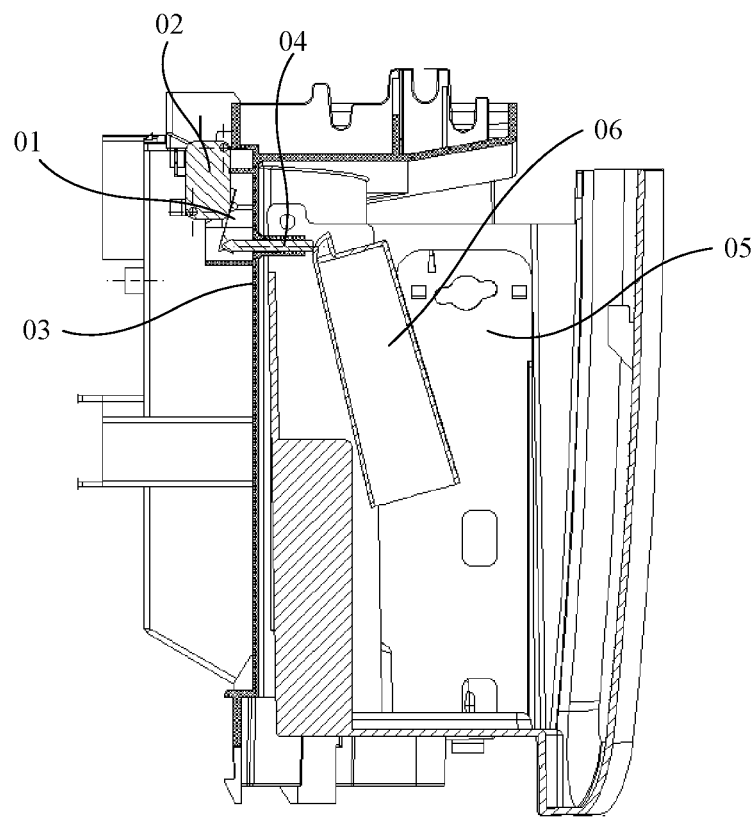
FIG. 1 is a schematic structural diagram of a water fullness alarm device for a dehumidifier and a dehumidifier according to the related art.

The technical solutions in the embodiments of the present disclosure will be described clearly and completely with reference to the accompanying drawings. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

It should be understood that in the description of the present disclosure, orientations or positional relationships indicated by terms "center", "upper", "lower", "front", "rear", "left", "right", "vertical", "horizontal", "top", "bottom", "inner", "outer", etc. are based on orientations or positional relationships shown in the drawings, merely to facilitate and simplify the description of the present disclosure, but not to indicate or imply that the referred devices or elements must have a particular orientation, or must be constructed or operated in a particular orientation. Therefore they should not be construed as limitations to the present disclosure.

Figure 2A:
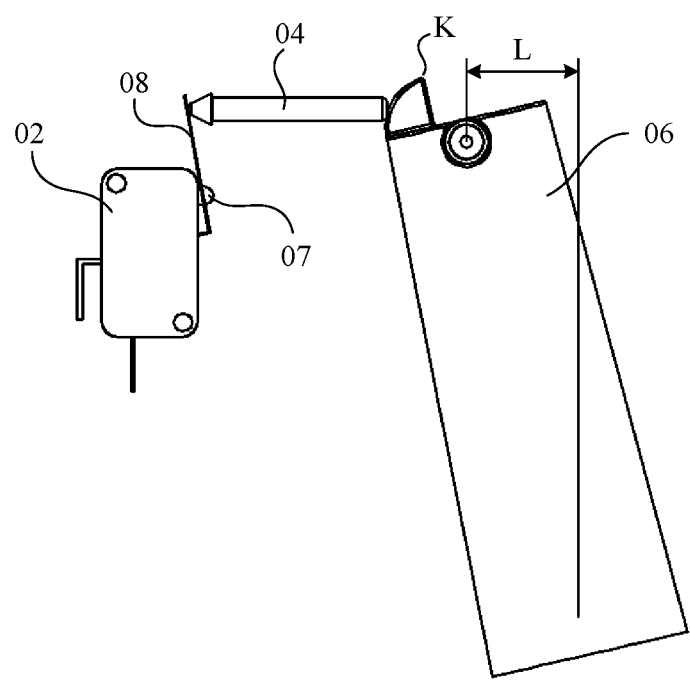
FIG. 2A is a schematic structural diagram of the water fullness alarm device for a dehumidifier shown in FIG. 1 in a normal state.

FIG. 1 shows a dehumidifier of the related art. The dehumidifier is provided with a water fullness alarm device. As shown in FIG. 1, the water fullness alarm device includes a microswitch 02 fixed on a support frame 01, a trigger bar 04 passing through a dehumidifier housing 03, and a buoy 06 hinged in a water collection tank 05. As shown in FIG. 2A, a button 07 is provided on the microswitch 02, and an elastic piece 08 is pressed on the button. One end of the elastic piece 08 is fixed on the microswitch 02, and another end thereof is free; one end of the trigger bar 04 is propped against the elastic piece 08, and another end thereof is propped against one end of the buoy 06. When there is less water in the water collection tank 05, the buoy 06, under the action of its own gravity, causes the trigger bar 04 to bear against the elastic piece 08 so as to bear against the microswitch 02. At this time, the dehumidifier is powered on. When the water in the water collection tank 05 reaches a certain amount, the buoy 06 floats upward as the water level rises, so that a force of the buoy 06 on the trigger bar 04 is reduced, and the trigger bar 04 and the microswitch 02 are separated. At this time, the dehumidifier is powered off. In this way, the water fullness alarm operation is realized. This structure is simple and easy to implement.

However, since the water fullness alarm device is composed of three parts—the microswitch 02, the trigger bar 04 and the buoy 06, and the trigger bar 04 is propped against both the microswitch 02 and the buoy 06, the connection structure is prone to wear. After a long time of use, frictional wear will occur between the trigger bar 04 and the elastic piece 08 on the microswitch 02, and between the trigger bar 04 and the buoy 06. The effects of frictional wear at the two places will add up and the obtained total frictional wear substantially reduce the transmission precision of the water fullness alarm device, therefore the reliability and stability of system response of the water fullness alarm device are low.

Based on this, some embodiments of the present disclosure provide an improved water fullness alarm device that can be applied to a dehumidifier. However, it is not limited thereto, and the provided water fullness alarm device can also be applied to other appliances that have a need to collect and discharge water during their operation. For example, it can be an air conditioner or refrigerator needs to collect water generated by compressors of these appliances during operation. Taking the water fullness alarm device being applied to the dehumidifier as an example, a water collection tank is provided in a dehumidifier, and the water collection tank can be taken out from a housing of the dehumidifier, so that the water collected in the water collection tank is poured out. Some components of the water fullness alarm device are fixed on the housing of the dehumidifier, and some components float on the liquid surface in the water collection tank.

Figure 5:
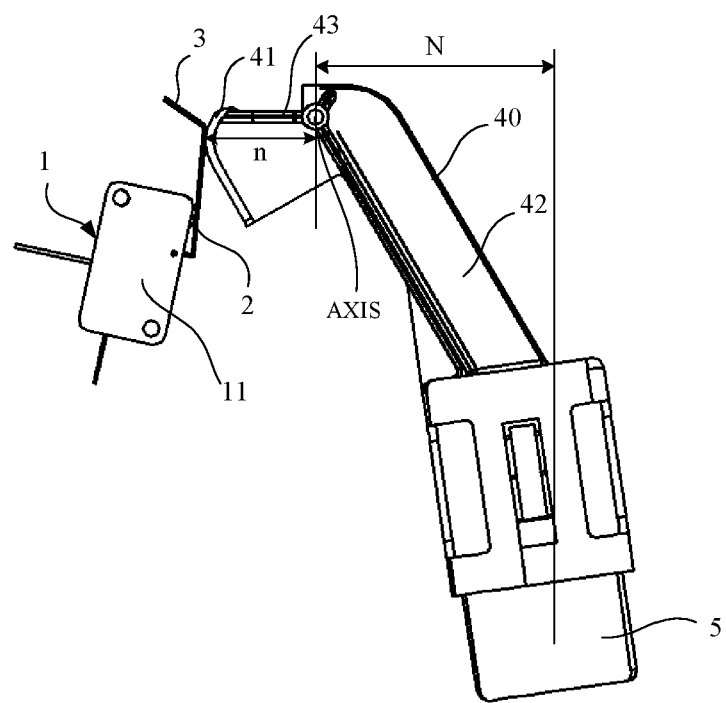
FIG. 5 is a schematic structural diagram of a water fullness alarm device according to some embodiments of the present disclosure.

FIG. 5 is a schematic structural diagram of a water fullness alarm device according to some embodiments of the present disclosure. Referring to FIG. 5, the water fullness alarm device includes an alarm switch 1, a bracket 4, and a float 5. The alarm switch 1 includes an alarm switch body 11, a switch button 2 is disposed on the alarm switch body 11. The switch button 2 is covered with an elastic piece 3; one end of the elastic piece 3 is fixed on the alarm switch body 11, and another end is free. The bracket 4 is rotatable; a first end of the bracket 4 is connected with a float 5, and a second end of the bracket 4 is propped against the elastic piece 3; the second end of the bracket 4 propped against the elastic piece 3 is configured to swing synchronously with the first end around a rotating axis of the bracket and drive the elastic piece 3 to trigger the switch button 2.

In the water fullness alarm device provided by some embodiments of the present disclosure, when the water level in the water collection tank reaches a certain level, the float 5 will float upward as the water level rises, and push the bracket 4 to swing around the rotating axis thereof. The first end of the bracket 4 and the second end of the bracket 4 are integrally formed and synchronously swing, therefore the second end of the bracket 4 propped against the elastic piece 3 can drive the elastic piece 3 to trigger the switch button 2 during the swinging synchronously with the first end of the bracket 4, and when the switch button 2 is triggered, an alarm operation will be realized.

Figure 3:
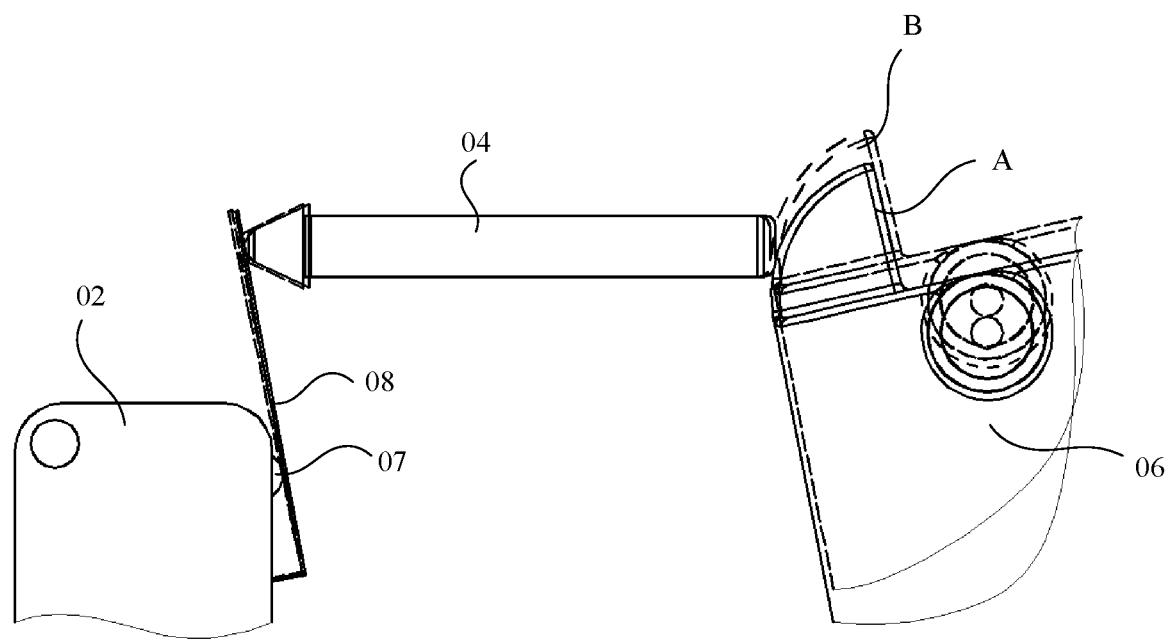
FIG. 3 is a schematic diagram showing a relative position change in the water fullness alarm device when a height deviation of a buoy occurs in the same shown in FIG. 2A.

However, in the related art, as shown in FIG. 3, the water fullness alarm device is composed of three independent parts of a microswitch 02, a trigger bar 04 and a buoy 06. Moreover, the trigger bar 04 is propped against the buoy 06 and the microswitch 02 respectively. In the water fullness alarm device shown in FIG. 3, the force is transmitted as follows: the buoy 06 (component rotating around the rotating axis)—the propped surface of the buoy 06 and the trigger bar 04—the trigger bar 04—the propped surface of the trigger bar 04 and the elastic piece 08—the elastic piece 08—microswitch 02.

Thus, in the related art (FIG. 3), the alarm is triggered through successive transmission between the elastic piece 08 on the microswitch 02 and the trigger bar 04, and between the trigger bar 04 and the buoy 06. In some embodiments of the present disclosure (such as the embodiment of FIG. 5), the alarm is triggered only through transmission between the bracket 4 connected with the float 5 and the elastic piece 3. The force is transmitted as follows: the float 5—the bracket 4 (component rotating around a rotating axis)—the elastic piece 3—the alarm switch 1. Therefore, the water fullness alarm device of FIG. 5 has a relatively simple and compact structure, a shorter dimensional chain, and higher reliability and stability of system response when compared to the related art.

In some embodiments, when the switch button 2 is triggered, the alarm operation performed by the alarm switch 1 may be sending an alarm sound to remind the user that the water is full, or displaying a "water full" prompt on the display screen to remind the user that the water is full. The alarm operation may also be directly cutting off the switching power supply of the dehumidifier to stop the dehumidification operation. The alarm operation is not specifically limited herein, as long as the water fullness information can be transmitted to the user.

The operation process of the switch button 2, the elastic piece 3, the bracket 4 and the float 5 is as follows: in the initial state, when the water level is low, the float 5, under the action of its own gravity, causes the second end of the bracket 4 propped against the elastic piece 3 to bear against the elastic piece 3 so as to bear against the switch button 2; when the water in the water collection tank rises gradually and reaches a certain level, the float 5 will float upward as the water level rises, so that a force from the second end of the bracket 4 propped against the elastic piece 3 on the elastic piece 3 is reduced, and the elastic piece 3 is separated from the switch button 2 to trigger the alarm switch 1.

In some embodiments, as shown in FIG. 5, the elastic piece 3 is disposed on a first side of the alarm switch body 11 facing the water collection tank, and the switch button 2 is also disposed on the first side. A lower end of the elastic piece 3 is fixed on the first side, and an upper end of the elastic piece 3 extends upward. In some embodiments, the elastic piece 3 is generally flat. In the initial state, the second end of the bracket 4 presses the elastic piece 3 tightly, so that the switch button 2 is in a tightly pressed state. After the float 5 floats up as the water level rises, the second end of the bracket 4 rotates about the rotating axis of the bracket 4 itself. Since the distance n between the contact point of the second end of the bracket 4 contacting with the elastic piece 3 and a vertical line passing through the rotating axis is reduced after the second end of the bracket 4 is rotated, the pressure applied to the elastic piece 3 by the contact point of the second end of the bracket 4 contacting with the elastic piece 3 is reduced, the elastic piece 3 is gradually separated from the switch button 2.

In some embodiments of the present disclosure, as shown in FIG. 5, a fixed end of the elastic piece 3 may be fixed to the alarm switch 1, or may be fixed on a support frame outside the housing of the dehumidifier, or may be fixed on the housing of the dehumidifier, which is not specifically limited herein, as long as the position of the fixed end of the elastic piece 3 is fixed relative to the alarm switch 1, the water collection tank and the rotating axis of the bracket 4.

A vertical plane containing the rotating axis of the bracket 4 is defined as a first plane (for convenience of description). In the initial state, the first end and the second end of the bracket 4 may be located on both sides of the first plane, or may be located on the same side of the first plane, which is not specifically limited herein, as long as the end of the bracket 4 propped against the elastic piece 3 can swing around the rotating axis of the bracket when the float 5 floats upward. In the case where the first end and the second end of the bracket 4 are located on both sides of the first plane, the first end of the bracket 4 will swing upward and the second end of the bracket 4 will swing downward when the float 5 floats upward; in the case where the first end and the second end of the bracket 4 are located on the same side of the first plane, both the first end and the second end of the bracket 4 will swing upward around the rotating axis of the bracket when the float 5 floats upward.

Figure 2B:
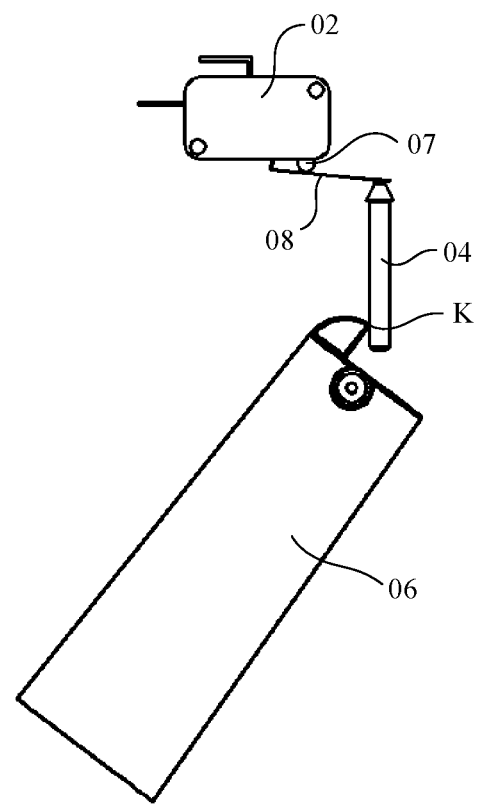
FIG. 2B is a schematic structural diagram of the water fullness alarm device for a dehumidifier shown in FIG. 2A in a laid-down state.
Figure 2C:
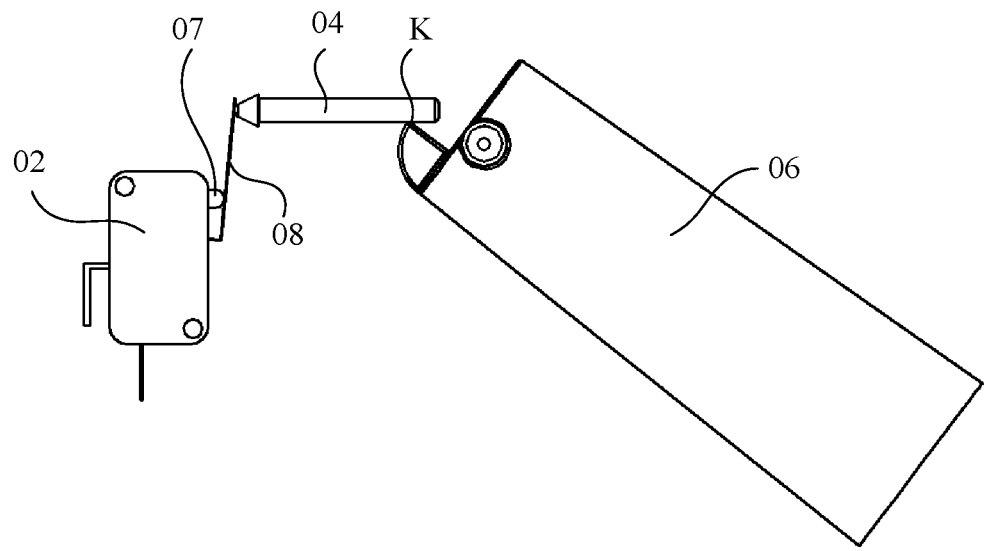
FIG. 2C is a schematic structural diagram of the water fullness alarm device for a dehumidifier shown in FIG. 2B in a normal state after being rotated.

In related art as shown in FIG. 2A, an end of the buoy 06 propped against the trigger bar 04 is provided with a quarter arc surface, and a top end of the arc surface is formed with a sharp corner K (a sharp corner K shown in FIG. 2A, which is an edge in a real object). In a normal state, an end of the trigger bar 04 close to the buoy 06 is propped against the arc surface. At this time, if the buoy 06 floats upward, the buoy 06 can gently push the trigger bar 04 to move via the arc surface. However, in the process of transporting the dehumidifier, it is usually necessary to lay the dehumidifier down to lower the center of gravity of the device. At this time, the buoy 06 can be rotated counterclockwise by a large angle under the action of its own gravity, separating the end portion close to the buoy 06 of the trigger bar 04 from the arc surface, as shown in FIG. 2B, propping the sharp corner K at the top end of the arc surface against a side wall of the trigger bar 04. After the dehumidifier is re-righted, as shown in FIG. 2C, the sharp corner K at the top end of the arc surface is still jammed on the side wall of the trigger bar 04 and it is difficult for the sharp corner K to return to the normal state. At this time, an alarm will be sent when the dehumidifier is turned on.

Figure 6A:
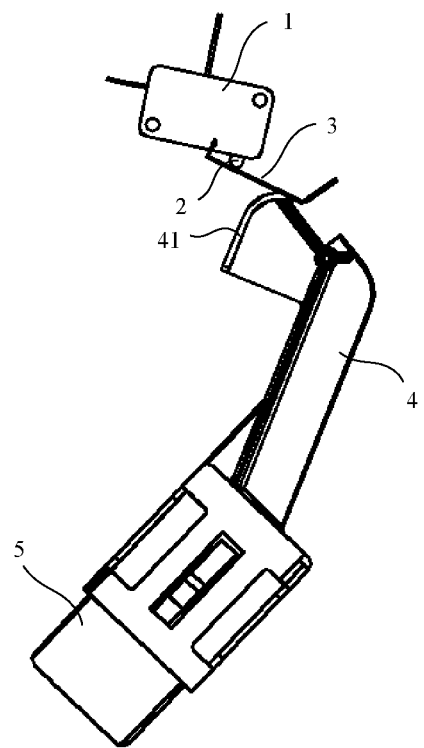
FIG. 6A is a schematic structural diagram of the water fullness alarm device shown in FIG. 5 in a laid-down state.
Figure 6B:
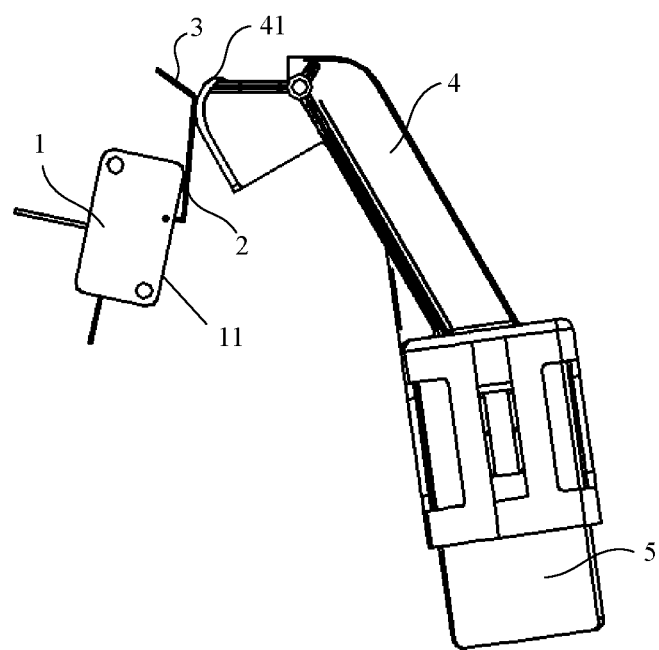
FIG. 6B is a schematic structural diagram of the water fullness alarm device shown in FIG. 6A in a normal state after being rotated.

In some embodiments of the present disclosure, since the first end and the second end are integrated (as shown in FIG. 5), a flange 41 (or "arc body 41" as described below) is provided on the second end of the bracket 4 propped against the elastic piece 3, and a contour of the flange 41 is smooth and continuous; the elastic piece 3 will always be propped against the flange 41 when the bracket 4 swings around the rotating axis thereof. Thus, as shown in FIG. 6A, when the dehumidifier is laid down, even if the bracket 4 is rotated counterclockwise by a large angle, the elastic piece 3 is still propped against the flange 41. Since the contour of the flange 41 is continuous, after the dehumidifier is re-righted, as shown in FIG. 6B, the bracket 4 can be restored to the normal state under the action of the gravity of the float 5. Consequently, the jamming problem is effectively avoided, and the dehumidifier can run normally after being turned on.

In related art shown in FIG. 2A, since the microswitch 02 is fixed on the support frame 01, and the rotating axis of the buoy 06 is fixed in the water collection tank 05, if there is a deviation in the relative position between the support frame 01 and the water collection tank 05 (e.g., the relative height between the support frame 01 and the water collection tank 05), the triggering accuracy of the alarm device will be seriously affected. as shown in FIG. 3, due to the deviation in the relative height between the support frame 01 and the water collection tank 05 which has existed before the buoy 06 floats upward, the position of the buoy 06 is deviated from a position A to a position B, at which time a deviation occurs in a length of the end of the trigger bar 04 propped against the elastic piece 08 protruding out of the housing 03, and a deviation also occurs in the relative position between the elastic piece 08 and the button 07. As a result, the elastic piece 08 and the button 07 cannot be separated after the water is full, thereby causing an alarm error and affecting the triggering accuracy of the alarm device. In addition, when the position of the buoy 06 is deviated from the position A to the position B, the length of the end of the trigger bar 04 propped against the elastic piece 08 protruding out of the housing 03 is rather long, the gap between the elastic piece 08 and the button 07 is a negative value, and the reaction force of the trigger bar 04 on the buoy 06 is too large. Consequently, it is difficult for the buoy 06 to float upward under the action of the original small initial buoyancy moment, and a jamming problem occurs.

Figure 7:
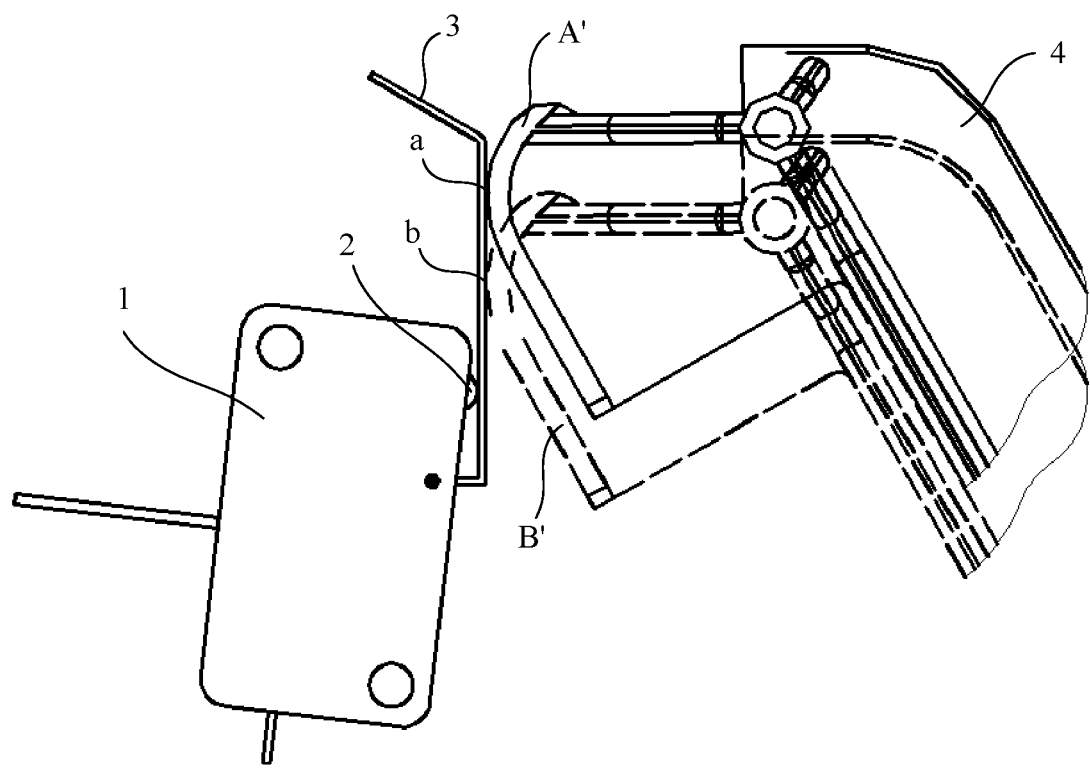
FIG. 7 is a schematic diagram showing a relative position change in the water fullness alarm device when a height deviation of a bracket occurs in the same according to some embodiments of the present disclosure.

In some embodiments of the present disclosure, as shown in FIG. 5, the elastic piece 3 can be substantially vertically disposed when the switch button 2 is in the tightly pressed state, and when there is a deviation in the height of the bracket 4, the elastic piece 3 will not swing, thereby ensuring the trigging accuracy of the alarm device and improving the ability of the alarm device to resist the interference of deviations. as shown in FIG. 7, due to the deviation in the relative height between the support frame and the water collection tank which has existed before the buoy floats upward, the position of the bracket 4 is deviated from a position A' to a position B', at which time the position of a contact point between the elastic piece 3 and the bracket 4 moves vertically from a point a to a point b, while the position of the elastic piece 3 remains unchanged, and the relative position between the elastic piece 3 and the switch button 2 remains unchanged, thereby avoiding an alarm error and ensuring the trigging accuracy of the alarm device. Moreover, when the position of the bracket 4 is deviated from the position A' to the position B', there is no mutual compression between the elastic piece 3 and the bracket 4, and the interaction force therebetween remains unchanged, so that the floating upward of the float 5 will not be affected.

In some embodiments, a distance n between a point on the second end of the bracket 4 contacting with the elastic piece 3 and a vertical line passing through the rotating axis when the switch button 2 is in the tightly pressed state is greater than distances between other points on the second end of the bracket 4 and a vertical line passing through the rotating axis.

It will be noted that, as for the dimensional deviation of the water fullness alarm device, the relative positional deviation between the alarm switch 1 and the rotating axis of the bracket 4 is mainly considered. The relative positional deviation between the alarm switch 1 and the rotating axis of the bracket 4 includes deviation in the horizontal direction and deviation in the vertical direction. Since a position-limiting structure for ensuring the mounting accuracy in the horizontal direction is usually provided in the dehumidifier, as for the relative positional deviation between the alarm switch 1 and the rotating axis of the bracket 4, the deviation in the vertical direction is mainly considered.

Figure 8:
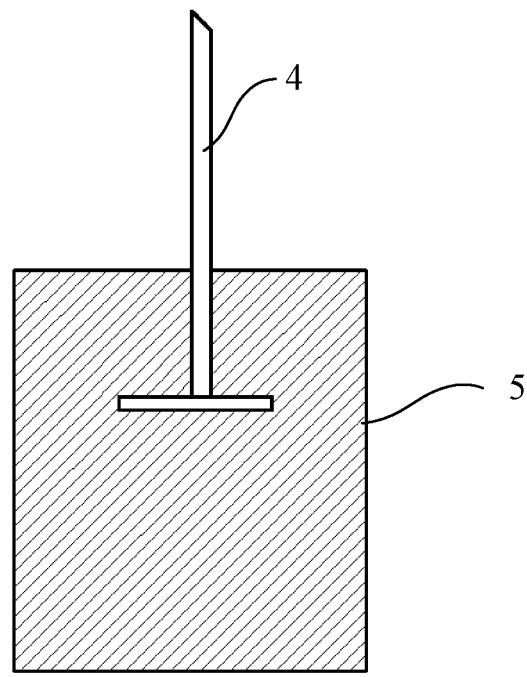
FIG. 8 is a schematic diagram showing a connection structure between a bracket and a float in a water fullness alarm device according to some embodiments of the present disclosure.

In some embodiments of the present disclosure, the connection structure between the bracket 4 and the float 5 may be a structure as shown in FIG. 8, that is, the first end of the bracket 4 connected with the float 5 is embedded in the interior of the float 5 for fixing. The connection structure between the bracket 4 and the float 5 may also be a structure as shown in FIG. 5, that is, the first end of the bracket 4 connected with the float 5 is fixed with a float mounting box 6, the float mounting box 6 is provided with a mounting opening 7, and the float 5 can be connected to the float mounting box 6 through the mounting opening 7. Compared with the first solution described above, the second solution can effectively fix the relative position of the float 5 and the bracket 4 by mounting the float 5 in the float mounting box 6, so as to prevent the float 5 from coming off the bracket 4.

Figure 9:
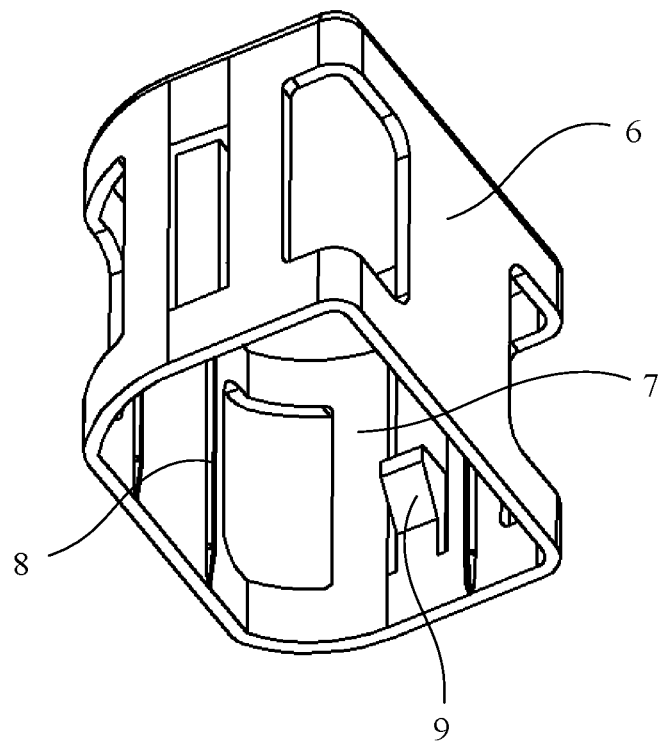
FIG. 9 is a schematic structural diagram of a float mounting box in a water fullness alarm device according to some embodiments of the present disclosure.

In order to prevent the float 5 from coming out of the mounting opening 7 by buoyancy, in some embodiments of the present disclosure, as shown in FIG. 9, the mounting opening 7 is opened at a lower end of the float mounting box 6. The buoyancy direction of the float 5 is opposite to the direction in which the float 5 comes out of the mounting opening 7 after the float 5 is mounted in the float mounting box 6. As a result, the buoyancy of the float 5 can press the float 5 tightly into the float mounting box 6 when the float 5 floats upward, so as to prevent the float 5 from coming off the float mounting box 6. On the contrary, if the float mounting opening 7 is opened at an upper end of the float mounting box 6, the buoyancy direction of the float 5 will be the same as the direction in which the float 5 comes out of the mounting opening 7, which is advantageous for the float 5 to come out of the mounting opening 7 by buoyancy.

As some embodiments of the connection structure between the float 5 and the float mounting box 6, the float mounting box 6 is provided with internal threads, an outer wall of the float 5 is provided with external threads that can be engaged with the internal threads, and the float 5 is connected to the float mounting box 6 by the threads. This connection structure has the advantages of relatively good stability and high precision.

As some embodiments of the connection structure between the float 5 and the float mounting box 6, the float mounting box 6 is provided with a snap-fit structure, and the float 5 can be snapped into the float mounting box 6 through the snap-fit structure, therefore the float 5 can be mounted in the floating mounting box 6 in a snap-fit manner. Compared with the threaded connection manner, the snap-fit manner takes less time and is more efficient.

In some embodiments, the snap-fit structure may be configured as a fastener, a protrusion, or the like, which is not specifically limited herein. In order to reduce the difficulty in manufacturing the snap-fit structure, as shown in FIG. 9, the snap-fit structure may be configured as ribs 8 disposed on an inner wall of the float mounting box 6, and the ribs 8 are in interference fit with a side wall of the float 5. This snap-fit structure is simple and easy to implement.

In order to reduce the force used in snapping the float 5 into the float mounting box 6 and reduce the difficulty of using the snap-fit structure, as shown in FIG. 9, an extending direction of the ribs 8 is parallel to a moving direction of the float 5 when the float 5 is being mounted in the float mounting box 6. Therefore, a surface that prevents the float 5 from entering the float mounting box 6 is a cross section of the ribs 8. As the cross-sectional area of the ribs 8 is small, the float 5 can be pressed into the float mounting box 6 with only a small force, and the snap-fit structure is not difficult to use.

In order to improve the reliability of the connection between the float 5 and the float mounting box 6, the float mounting box 6 can be constructed as shown in FIG. 9, that is, a fastener 9 is provided on an inner wall of the float mounting box 6, and a slot is provided on an outer wall of the float; when the float 5 is mounted in the float mounting box 6, the fastener 9 can be locked in the slot. Therefore, the relative position between the float 5 and the float mounting box 6 is fixed through the engagement between the fastener 9 and the slot, and the reliability of the connection between the float 5 and the float mounting box 6 is improved.

In order to further improve the reliability of the connection between the float 5 and the float mounting box 6, the float mounting box 6 can be constructed as shown in FIG. 9, that is, a plurality of fasteners 9 are provided, and the plurality of fasteners 9 are evenly arranged along the inner wall of the float mounting box 6; a plurality of slots are provided, and the plurality of slots are evenly arranged along the outer wall of the float 5; and the plurality of fasteners 9 are locked in the plurality of slots in one-to-one correspondence. Therefore, the reliability of the connection between the float 5 and the float mounting box 6 is further improved through the corresponding engagement between the plurality of fasteners 9 and the plurality of slots.

Figure 10:
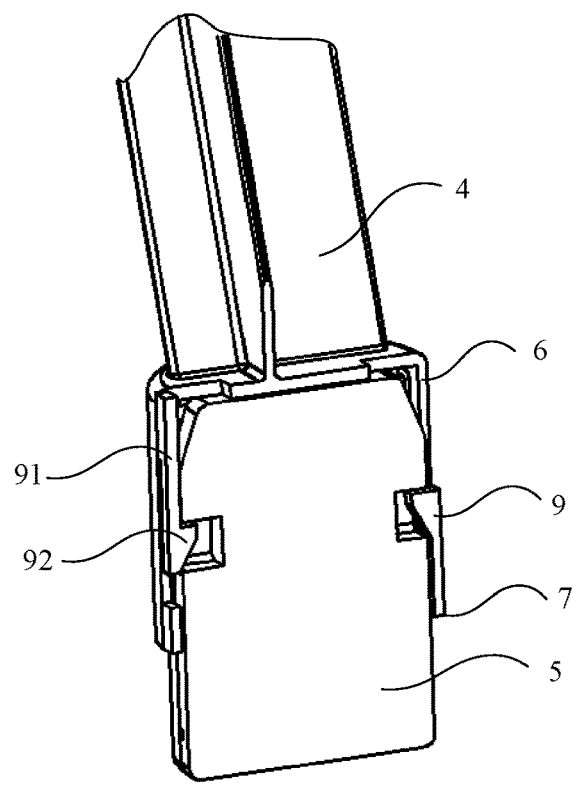
FIG. 10 is a first schematic structural diagram showing a position of a fastener in a float mounting box in a water fullness alarm device according to some embodiments of the present disclosure.
Figure 11:
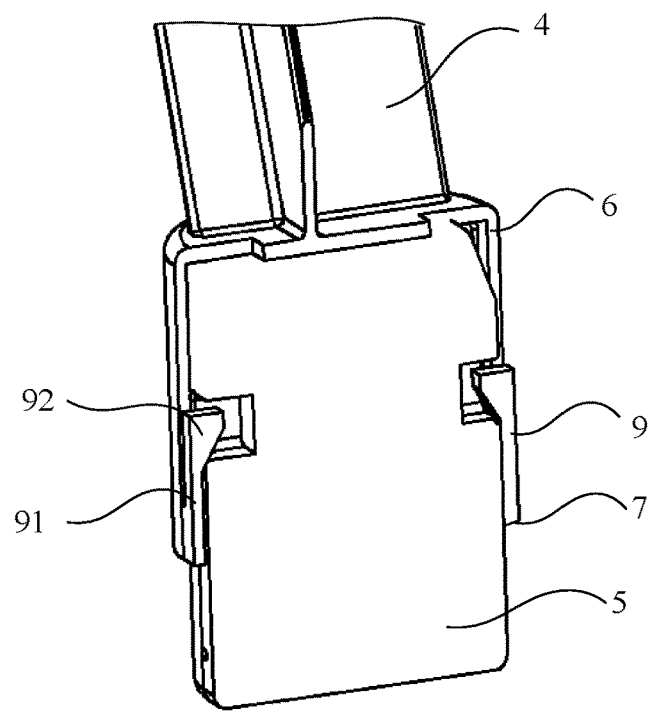
FIG. 11 is a second schematic structural diagram showing a position of a fastener in a float mounting box in a water fullness alarm device according to some embodiments of the present disclosure.

The structure of the fastener 9 can be as shown in FIG. 10, that is, the fastener 9 includes a fixed end 91 and a snap-in end 92, and the snap-in end 92 of the fastener 9 is located at a side of the fixed end 91 close to the mounting opening 7. Therefore, when the float 5 moves toward the mounting opening 7 and is ready to come off the float mounting box 6, the fastener 9 will open outwardly under the action of a moment, and cannot effectively prevent the float 5 from coming off the float mounting box 6. In order to avoid the above problem, as shown in FIG. 11, the snap-in end 92 of the fastener 9 is located on a side of the fixed end 91 away from the mounting opening 7. Therefore, when the float 5 moves toward the mounting opening 7 and is ready to come out of the float mounting box 6, the fastener 9 cannot be opened outwardly by the moment, and the float 5 is locked under the action of a moment of force to prevent the float 5 from coming out of the float mounting box 6, thereby further improving the reliability of the connection between the float 5 and the float mounting box 6.

In some embodiments, the structure of the fastener 9 may include a vertical protrusion and a horizontal protrusion as shown in FIG. 9; an end of the vertical protrusion is fixed, and another end is free; the horizontal protrusion is fixed to the free end of the vertical protrusion, and the horizontal protrusion is locked in the slot. The fastener 9 may also be an elastic piece, with one end fixed to the inner wall of the float mounting box 6 and another end obliquely disposed. The fastener 9 may of course be other structures, which is not specifically limited herein.

In related art as shown in FIG. 2A, the buoyancy arm (i.e., L shown in FIG. 2A) is usually less than 20 mm, and the buoyancy moment for driving the buoy 06 to rotate is small under the action of the buoyancy arm; if a jam occurs between the buoy 06 and the trigger bar 04, it will be difficult for the small buoyance moment to drive the buoy 06 to float upward, thereby disabling the water fullness alarm device. In order to avoid the above problem, in some embodiments of the present disclosure as shown in FIG. 5, the buoyancy arm N (i.e., the horizontal distance between the float 5 and the rotating axis of the bracket 4) is greater than 20 mm, which will increase the buoyancy moment for driving the bracket 4 to rotate, thereby avoiding the occurrence of a jam.

In order to determine the buoyancy, the buoyancy should be applied to the float 5, and it should be avoided to apply the buoyancy to the bracket 4 as much as possible. Therefore, in some embodiments of the present disclosure, the rotating axis of the bracket 4 is fixed, and the first end of the bracket 4 connected with the float 5 is inclined downward. When the liquid level rises, the water first comes into contact with the float 5 to generate buoyancy, instead of being in contact with the bracket 4. In this way, the buoyancy is only applied to the float 5, which is advantageous for determining the buoyancy.

In order to improve the alarm response accuracy of the water fullness alarm device, it is usually required that the alarm switch 1 is not sensitive to the rise of the water level when the float 5 is at a low water level, and the alarm switch 1 is sensitive to the rise of the water level when the float 5 is at a high water level. That is, it is required that the action of the float 5 is small at a low water level, and large at a high water level, i.e. when reflected at a release amount of the switch button 2: the release amount of the switch button 2 is small at a low water level, and the release amount of the switch button 2 is large at a high water level. For example, at a low water level, the release amount of the switch button 2 is 0.05 mm when the water level in the water collection tank increases by 1 cm; at a high water level, the release amount of the switch button 2 is 0.2 mm when the water level in the water collection tank increases by 1 cm. In this way, not only the alarm response accuracy of the water fullness alarm device can be improved, but also the mechanical wear of the water fullness alarm device can be reduced.

Figure 12:
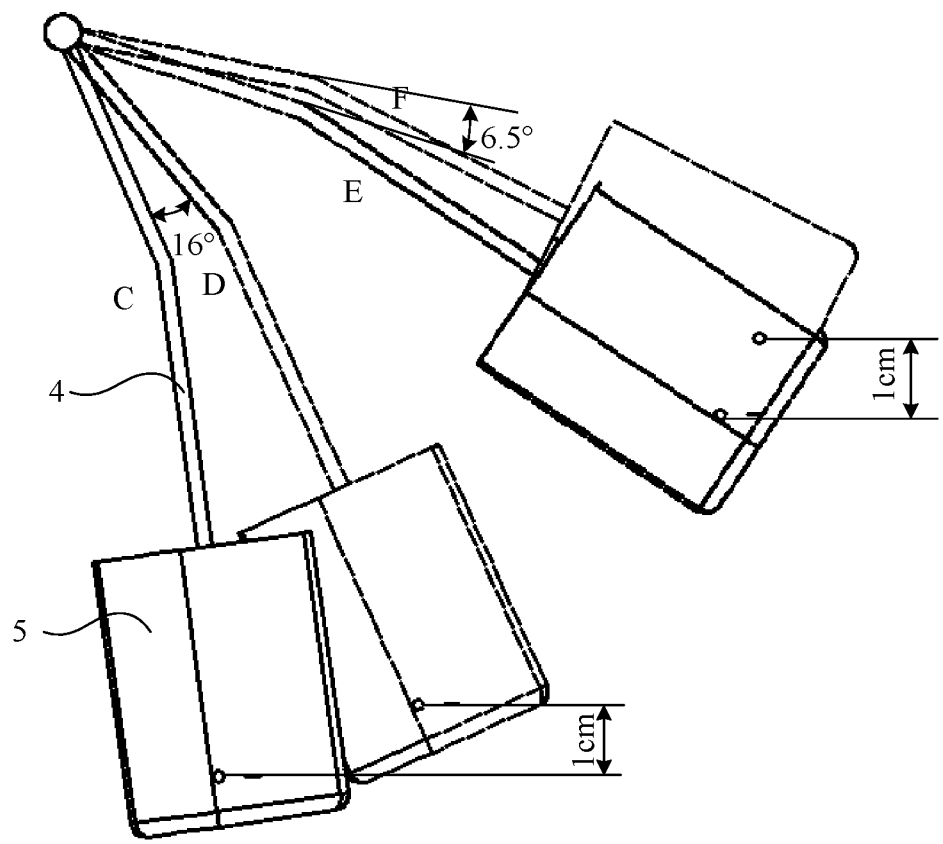
FIG. 12 is a schematic diagram of a system structure when a float is floating upward, and is in a position C, a position D, a position E, and a position F in a water fullness alarm device according to some embodiments of the present disclosure.
Figure 13:
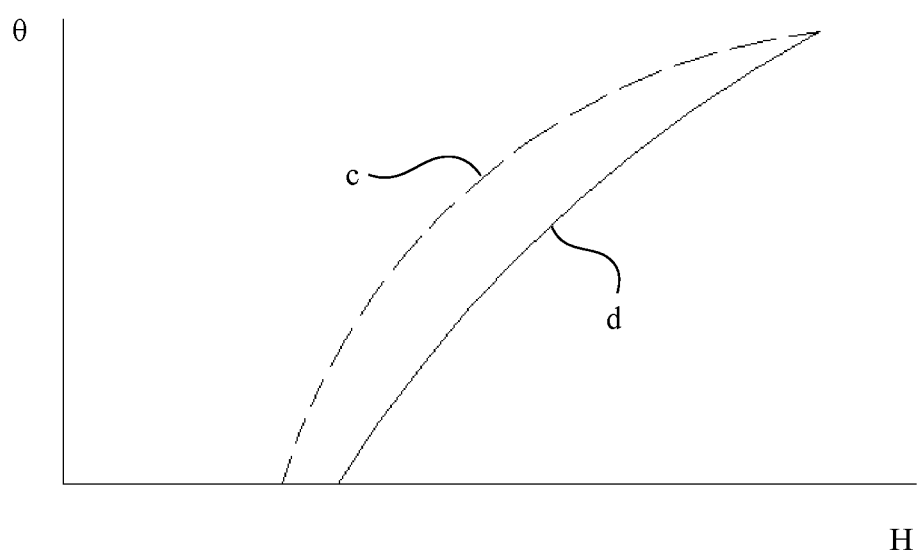
FIG. 13 is a comparison diagram of relation curves showing a relationship between a water level and a rotation angle of a bracket in a water fullness alarm device according to some embodiments of the present disclosure.

However, contrary to the above feature, in related art there is always a problem in the buoyancy for driving the float 5 to float upward. That is, the rotation is fast at a low water level, and the rotation is slow at a high water level. As shown in FIG. 12, the float 5 floats upward from a position C to a position D, a position E and a position F in order, wherein the floating height of the float 5 from the position C to the position D is 1 cm, and the rotation angle of the bracket 4 is 16°; the floating height of the float 5 from the position E to the position F is also 1 cm, but the rotation angle of the bracket 4 is reduced to 6.5°. Therefore, in order to reduce the difference between the rotation angle of the float 5 at a high water level and the rotation angle of the float 5 at a low water level as much as possible, the angle between the first end of the bracket 4 connected with the float 5 and the vertical direction when the float 5 is in the initial position should be increased. In related art, the angle between the first end of the bracket 4 connected with the float 5 and the vertical direction is usually less than 11.8°. In order to increase the angle between the first end of the bracket 4 connected with the float 5 and the vertical direction, the present disclosure may make sure that the angle between the first end of the bracket 4 connected with the float 5 and the vertical direction is greater than 11.8°, that is, an inclination angle of the first end of the bracket 4 connected with the float 5 is less than 78.2°. Referring to FIG. 13, curve c shows a relationship between the water level H and the rotation angle θ of the bracket 4 when the initial angle between the first end of the bracket 4 connected with the float 5 and the vertical direction is 11.8° inn the related art, curve d shows a relationship between the water level H and the rotation angle θ of the bracket 4 when the initial angle between the first end of the bracket 4 connected with the float 5 and the vertical direction is 22.4° in accordance with the present disclosure. As can be seen from FIG. 13, compared with the related art, the change relationship between the water level and the rotation angle of the bracket 4 in embodiments of the present disclosure is more like a linear and uniform change, thereby improving the rotation characteristics of the float 5.

Figure 14:
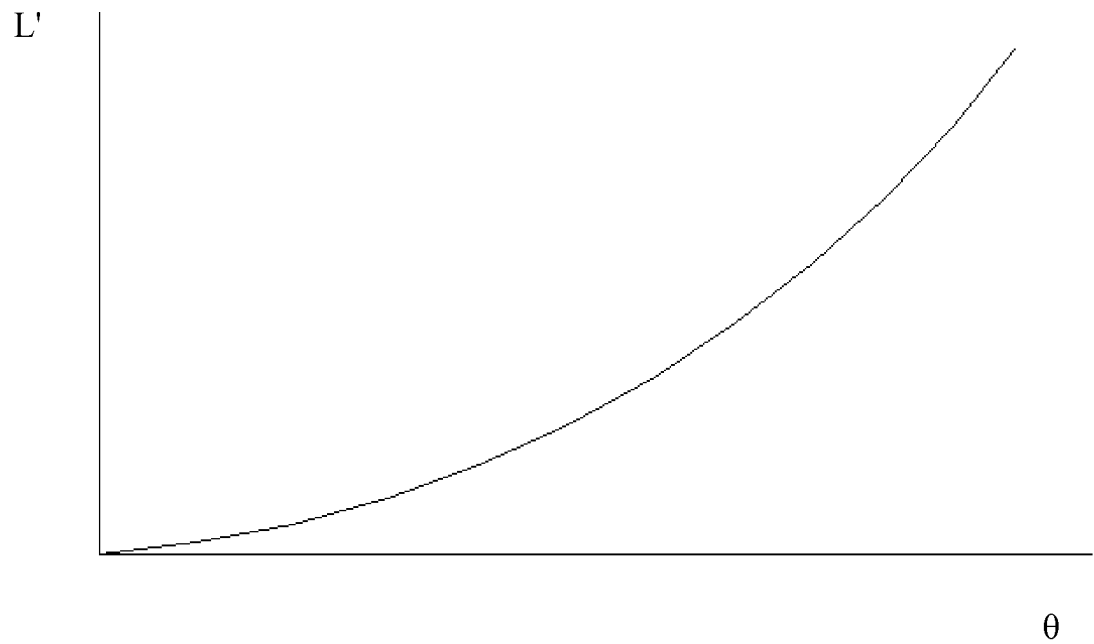
FIG. 14 is a relation curve showing the relationship between a rotation angle of a bracket and a horizontal distance between a rotating axis of a bracket and a contact point between a flange and an elastic piece in a water fullness alarm device according to some embodiments of the present disclosure.

In order to make sure that the release amount of the switch button 2 is small at a low water level and is largest a high water level, so as to improve the alarm response accuracy of the water fullness alarm device, a rate of change (that is, a horizontal distance between the rotating axis of the bracket 4 and a contact point between the flange 41 and the elastic piece 3) gradually increases as the rotation angle of the bracket 4 gradually increases. As a result, at a low water level, the second end of the bracket 4 propped against the elastic piece 3 drives the elastic piece 3 to swing around its fixed end to a small extent; at a high water level, the second end of the bracket 4 propped against the elastic piece 3 drives the elastic piece 3 to swing around its fixed end to a large extent. With the elastic piece 3 acting on the switch button, that is, at a low water level, the release amount of the switch button 2 is small; at a high water level, the release amount of the switch button 2 is large, thereby improving the alarm response accuracy of the water fullness alarm device. Advantageously, assuming that the horizontal distance between the rotating axis of the bracket 4 and the contact point between the flange 41 and the elastic piece 3 is a first distance, FIG. 14 shows a relationship between a change amount L' of the first distance and the rotation angle θ of the bracket 4. As can be seen from FIG. 14, as the rotation angle θ gradually increases, the change amount L' of the first distance gradually increases, and the rate of change (that is, a ratio ΔL'/Δθ of the unit change amount of the first distance to the unit angle change amount) of the first distance also gradually increases.

Figure 15:
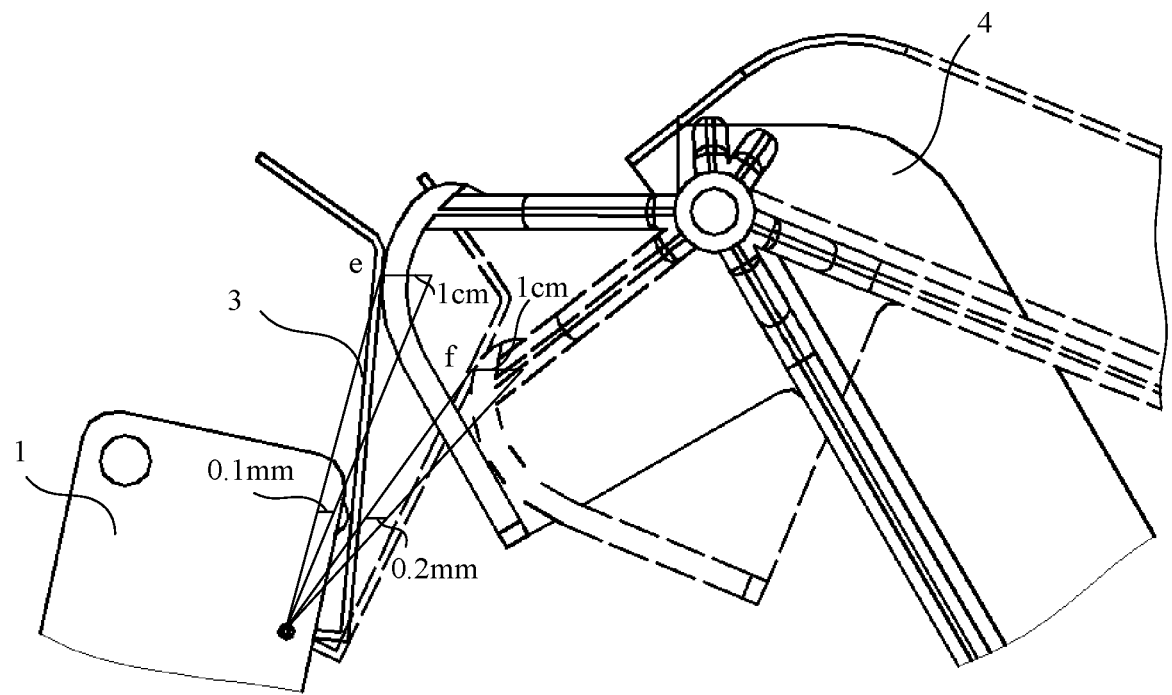
FIG. 15 is a schematic diagram showing a position change of a contact point between an elastic piece and a flange when a float floats upward in a water fullness alarm device according to some embodiments of the present disclosure.
Figure 16:
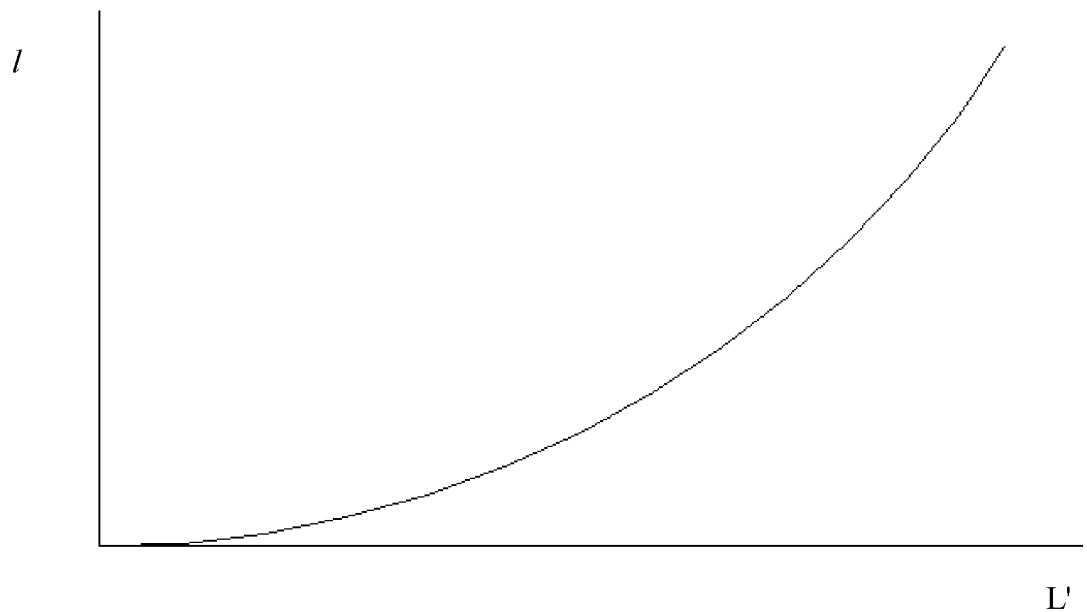
FIG. 16 is a relation curve showing the relationship between a release amount of the switch button and a horizontal distance between a rotating axis of a bracket and a contact point between a flange and an elastic piece in a water fullness alarm device according to some embodiments of the present disclosure.

In order to make sure that the release amount of the switch button 2 is small at a low water level and is high at a high water level, so as to improve the alarm response accuracy of the water fullness alarm device, in some embodiments of the present disclosure, the distance between the fixed end of the elastic piece 3 and the contact point between the flange 41 and the elastic piece 3 gradually decreases when the float 5 floats upward. Therefore, according to the principle that the corresponding sides of similar triangles are proportional, as the contact point between the flange 41 and the elastic piece 3 moves closer to the fixed end of the elastic piece 3, the horizontal movement of the contact point per unit distance has a greater influence on the release amount of the switch button 2. Advantageously, as shown in FIG. 15, when the contact point between the flange 41 and the elastic piece 3 moves from a point e to a point f, the distance between the contact point and the fixed end of the elastic piece 3 is reduced. When the contact point between the flange 41 and the elastic piece 3 moves by 1 cm in a horizontal direction of the point e, the release amount of the switch button 2 is 0.1 mm; when the contact point between the flange 41 and the elastic piece 3 moves by 1 cm in a horizontal direction of the point f, the release amount of the switch button 2 is 0.2 mm. Advantageously, FIG. 16 is a relation curve showing a relationship between the change amount L' of the first distance and the release amount I of the switch button 2. As can be seen from FIG. 16, as the change amount L' of the first distance increases, the release amount I of the switch button 2 gradually increases, and a release rate (that is a ratio ΔI/Δθ of unit release to unit angle change) of the switch button 2 also gradually increases, thereby making sure that the release amount of the switch button 2 is small at a low water level and is large at a high water level. Therefore, the alarm response accuracy of the water fullness alarm device is improved.

In some embodiments, the bracket 4 includes a rotating axis AXIS (see FIG. 5), and a first rod 42 and a second rod 43 extending radially from the rotating axis AXIS. An end of the first rod 42 connected to the float 5 is the first end of the bracket 4, and the position of the second rod 43 propped against the elastic piece 3 is the second end of the bracket 4.

In some embodiments, the bracket 4 includes a rotating axis AXIS, a first rod 42 and a second rod 43 extending radially from the rotating axis AXIS, and an arc body 41 (i.e., the flange) provided on an end of the second rod 43 away from the rotation axis AXIS. An end of the first rod 42 connected to the float 5 is the first end of the bracket 4, and the arc body 41 is the second end of the bracket 4.

In some embodiments, the arc body 41 includes a first arc end and a second arc end.

A joint of the first arc end and an end of the second rod 43 away from the rotating axis AXIS has a smooth contoured surface. It can be ensured that the first arc end does not jammed with the elastic piece 3 during the swinging of the bracket 4 about the rotation axis AXIS. This may advantageously make the relative movement between the elastic piece 3 and the arc body 41 relatively smooth, and the product quality and user experience have been improved.

The second arc end extends in the direction of gravity. At a low water level, a point between the first arc end and the second arc end propped against the elastic piece 3 to keep the switch button 2 in a tightly pressed state. The distance n between the point and the vertical line passing through the rotating axis AXIS is greater than the distance between the first arc end and the vertical line passing through the rotating axis AXIS.

In some embodiments, the curvature at the position of the arc body 41 where the arc body propped against the elastic piece 3 is larger than the curvature of the other position of the arc body 41.

In conclusion, the alarm response accuracy of the water fullness alarm device can be improved by at least the following two features: (1) as a rotation angle of the bracket 4 gradually increases, a rate of change of a horizontal distance between the rotating axis of the bracket 4 and a contact point between the flange 41 and the elastic piece 3 gradually increases; and (2) when the float 5 floats upward, a distance between a fixed end of the elastic piece 3 and a contact point between the flange 41 and the elastic piece 3 gradually decreases.

Figure 17:
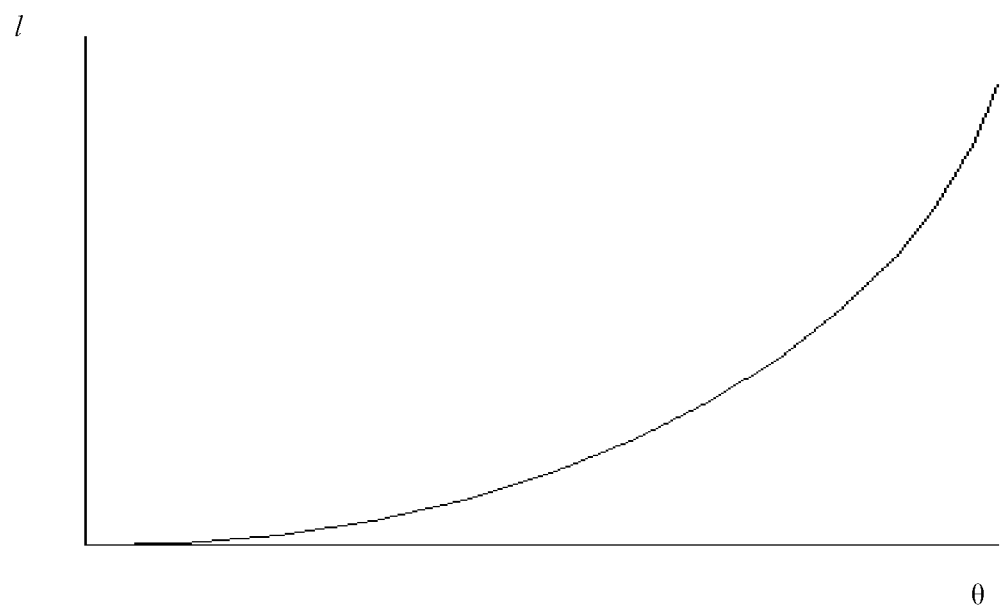
FIG. 17 is a relation curve showing the relationship between a rotation angle of a bracket and a release amount of a switch button after the relation curve shown in FIG. 14 and the relation curve shown in FIG. 16 are superimposed.
Figure 18:
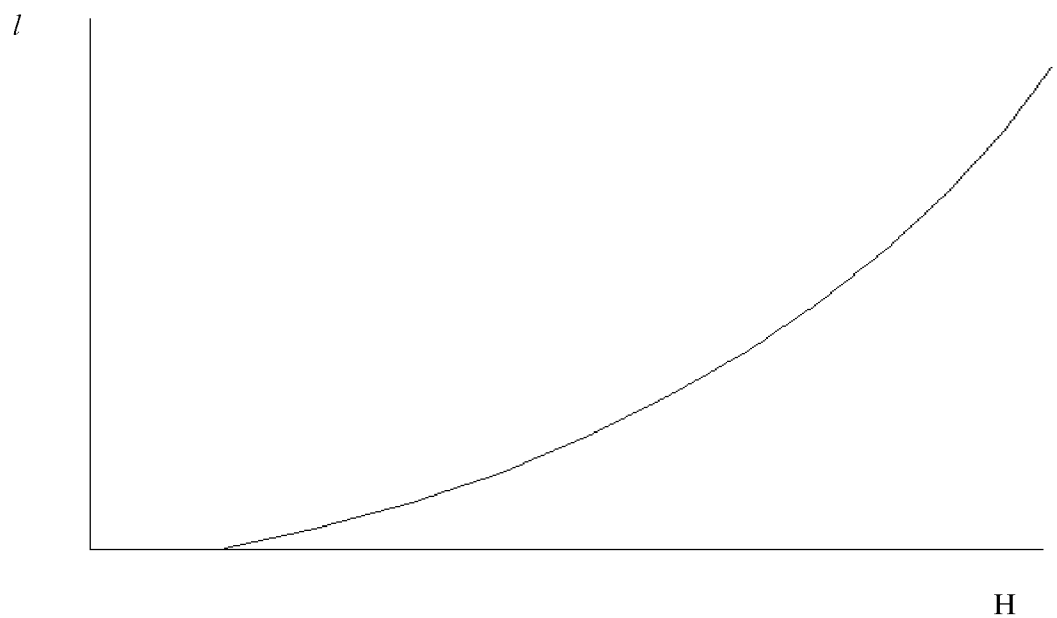
FIG. 18 is a relation curve showing the relationship between a water level and a release amount of a switch button after the relation curve shown in FIG. 14, the relation curve shown in FIG. 16, and the relation curved shown in FIG. 13 are superimposed.

The water fullness alarm device provided by embodiments of the present disclosure may have one of the two features above, and may have the two features at the same time, which is not specifically limited herein. Advantageously, in the case where the water fullness alarm device provided by some embodiments of the present disclosure have the two features at the same time, that is, FIG. 14 and FIG. 16 are superimposed to obtain FIG. 17. Compared with the curve shown in FIG. 14 and the curve shown in FIG. 16, in the obtained FIG. 17, the release amount of the switch button 2 is larger at a high water level. Correspondingly, the sensitivity is higher, and the alarm response accuracy is higher. Therefore, even if the curve d shown in FIG. 13 is further superimposed on the superimposed curve as shown in FIG. 17, in the obtained curve as shown in FIG. 18, the requirement that the release amount of the switch button 2 is small at a low water level and is large at a high water level will still be met.

Figure 4:
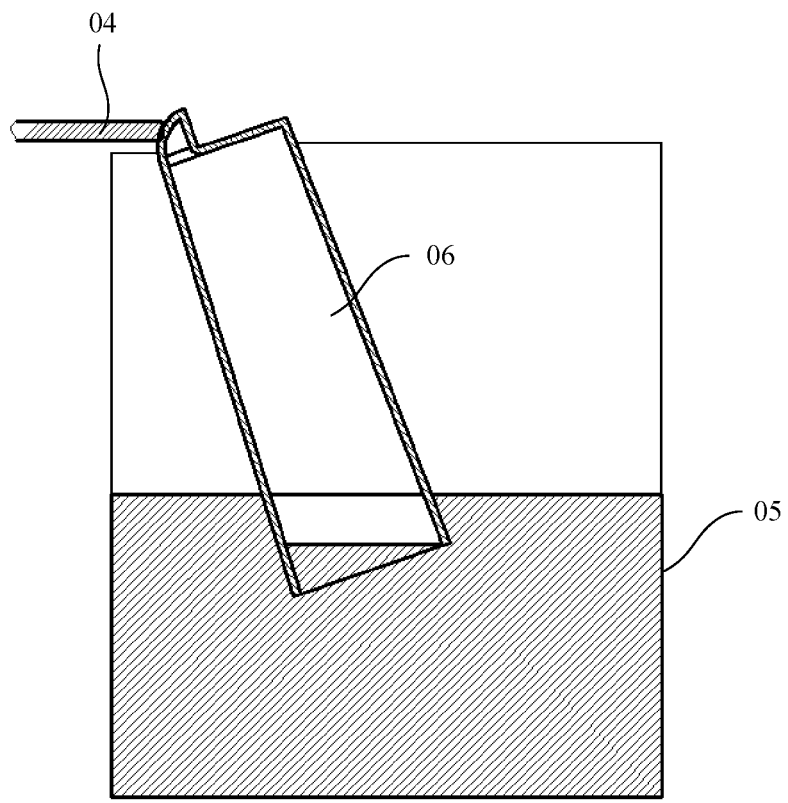
FIG. 4 shows a positional relationship between a buoy and a liquid level in a water collection tank when the buoy floats upward in the water fullness alarm device shown in FIG. 2A.

In related art shown in FIG. 2A, the buoy 06 has a barrel structure. As shown in FIG. 4, an upper end of the barrel structure is closed, and a lower end is open. When a bottom of the buoy 06 and a liquid level of the water collection tank 05 are in contact, the buoy 06 generates buoyancy by the air stored therein. Due to the small cross-sectional area of the buoy 06, the buoyancy generated by the buoy 06 is small; and due to the vibration of the whole machine, the air inside the buoy 06 may be discharged as bubbles, causing the buoyance generated by the buoy 06 to be unstable. In order to avoid the above problem, as shown in FIG. 5, the float 5 is made of a foam material. Compared with the related art, in which the buoyancy is generated by air, the present disclosure uses the foam material to generate buoyancy, so that the buoyancy generated is relatively larger than other material and more stable.

Figure 19:
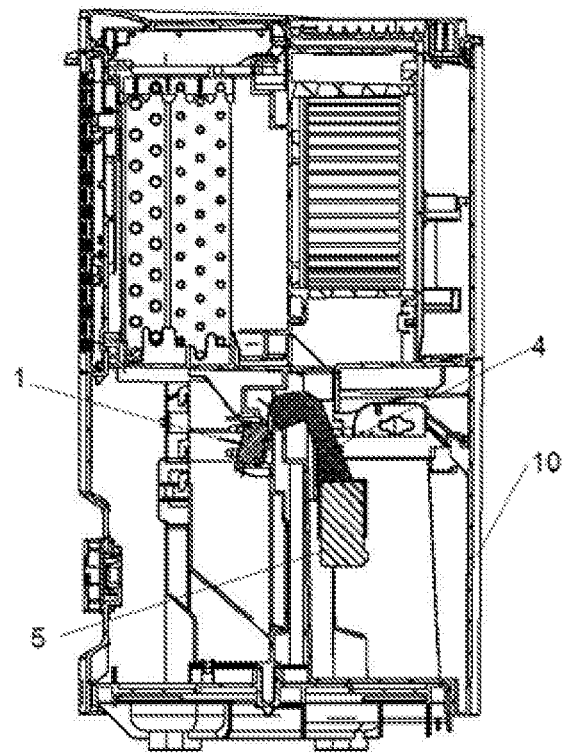
FIG. 19 is a schematic structural diagram of a dehumidifier according to some embodiments of the present disclosure.

In another aspect, some embodiments of the present disclosure also provide a dehumidifier. As shown in FIG. 19, the dehumidifier includes a housing 10 having a water collection tank and a water fullness alarm device as described above. And an alarm switch 1 in the water fullness alarm device is fixed to the housing 10, a float 5 therein is located in the water collection tank.

The beneficial effects that the above dehumidifier are the same as those achieved by the water fullness alarm device described above.

In the description of this disclosure, specific features, structures, materials or characteristics may be combined in any suitable manner in any one or more embodiments or examples.

The foregoing descriptions are merely some specific implementation manners of the present disclosure, but the protection scope of the present disclosure is not limited thereto, and the changes or replacements that any person skilled in the art can easily think of in the technical scope disclosed by the present disclosure should be within the protection scope of the present disclosure. Therefore, the protection scope of the present disclosure shall be subject to the protection scope of the claims.

What is claimed is:

1. A water fullness alarm device, comprising:
   an alarm switch; a bracket; and a float,
   wherein the alarm switch includes an alarm switch body and a switch button disposed on the alarm switch body, wherein the switch button is adjacent to an elastic piece, and wherein a first end of the elastic piece is fixed on the alarm switch body and a second end of the elastic piece is free,
   wherein the bracket is rotatable, wherein a first end of the bracket is connected with the float, and wherein a second end of the bracket comprises a flange that is propped against the elastic piece,
   wherein the first end and the second end of the bracket are integrally formed such that the second end swings synchronously with the first end around an axis when the bracket rotates, and
   wherein the second end of the bracket drives the elastic piece to trigger the switch button when the bracket rotates,
   wherein a contour of the flange is smooth and continuous such that when the bracket rotates, the elastic piece remains in contact with the flange,
   wherein as a rotation angle of the bracket gradually increases, a ratio of a unit change of a horizontal distance between the axis of the bracket and a contact point between the flange and the elastic piece to a unit change of rotation angle of the bracket gradually increases.

2. The water fullness alarm device according to claim 1, wherein the bracket includes a rotating axis, a first rod and a second rod extending radially from the rotating axis, and an arc body provided on an end of the second rod away from the rotating axis, wherein an end of the first rod connected to the float is the first end of the bracket, and wherein the arc body is the second end of the bracket, and
   wherein the arc body includes a first arc end and a second arc end, wherein the first arc end has a smooth contoured surface at a joint of an end of the second rod away from the rotating axis, and wherein the second arc end extends in the direction of gravity.

3. The water fullness alarm device according to claim 1, wherein when the water fullness alarm device is in a state of use, the elastic piece is substantially vertically disposed.

4. The water fullness alarm device according to claim 1, wherein the first end of the bracket connected with the float includes a float mounting box, the float mounting box having a mounting opening, wherein the float is connectable to the float mounting box through the mounting opening.

5. The water fullness alarm device according to claim 4, wherein the mounting opening is opened at an end of the float mounting box away from the bracket.

6. The water fullness alarm device according to claim 4, wherein the float mounting box is includes a snap-fit structure, and wherein the float is connectable with the float mounting box via the snap-fit structure.

7. The water fullness alarm device according to claim 6, wherein the snap-fit structure includes ribs disposed on an inner wall of the float mounting box, and wherein the ribs are in interference fit with a side wall of the float.

8. The water fullness alarm device according to claim 7, wherein an extending direction of the ribs is parallel to a moving direction of the float when the float is being mounted in the float mounting box.

9. The water fullness alarm device according to claim 4, wherein an inner wall of the float mounting box includes a fastener, wherein an outer wall of the float includes a slot, and wherein when the float is mounted in the float mounting box, the fastener is lockable in the slot.

10. The water fullness alarm device according to claim 9, wherein a plurality of fasteners are included, wherein the plurality of fasteners are evenly arranged along the inner wall of the float mounting box, wherein plurality of slots are included, wherein the plurality of slots are evenly arranged along the outer wall of the float, and wherein the plurality of fasteners are locked in the plurality of slots in one-to-one correspondence.

11. The water fullness alarm device according to claim 9, wherein the fastener includes a fixed end and a snap-in end, and wherein the snap-in end of the fastener is located at a side of the fixed end away from the mounting opening.

12. The water fullness alarm device for according to claim 1, wherein a horizontal distance between the float and the axis of the bracket is greater than 20 mm.

13. The water fullness alarm device according to claim 1, wherein the axis of the bracket is fixed, and wherein the first end of the bracket connected with the float extends away from the axis and is inclined with respect to the elastic piece.

14. The water fullness alarm device according to claim 13, wherein an inclination angle of the first end of the bracket connected with the float with respect to the elastic piece is less than 78.2°.

15. The water fullness alarm device according to claim 1, wherein when the float floats upward, a distance between a fixed end of the elastic piece and a contact point between the flange and the elastic piece is configured to gradually decrease.

16. The water fullness alarm device according to claim 1, wherein the float is made at least partially of foam material.

17. A dehumidifier comprising a housing, a water collection tank, and the water fullness alarm device according to claim 1, wherein the alarm switch in the water fullness alarm device is fixed on the housing, and wherein the float is located at the water collection tank.

18. A method, comprising:
   forming a water fullness alarm device, the water fullness alarm device having an alarm switch; a bracket; and a float,
   wherein the alarm switch includes an alarm switch body and a switch button disposed on the alarm switch body, wherein the switch button is adjacent to an elastic piece, and wherein a first end of the elastic piece is fixed on the alarm switch body and a second end of the elastic piece is free,
   wherein the bracket is rotatable, wherein a first end of the bracket is connected with the float, and wherein a second end of the bracket comprises a flange that is propped against the elastic piece, wherein the first end and the second end of the bracket are integrally formed such that the second end swings synchronously with the first end around an axis when the bracket rotates, and wherein the second end of the bracket drives the elastic piece to trigger the switch button when the bracket rotates, wherein a contour of the flange is smooth and continuous such that when the bracket rotates, the elastic piece remains in contact with the flange, wherein as a rotation angle of the bracket gradually increases, a ratio of a unit change of a horizontal distance between the axis of the bracket and a contact point between the flange and the elastic piece to a unit change of rotation angle of the bracket gradually increases.

\* \* \* \* \*